(12) United States Patent  
Bourret

(10) Patent No.: US 7,233,348 B2  
(45) Date of Patent: Jun. 19, 2007

(54) TEST METHOD

(75) Inventor: Alexandre J Bourret, Ipswich (GB)

(73) Assignee: British Telecommunications public limited company, London (GB)

( * ) Notice: Subject to any disclaimer, the term of this patent is extended or adjusted under 35 U.S.C. 154(b) by 408 days.

(21) Appl. No.: 10/275,474

(22) PCT Filed: May 29, 2001

(86) PCT No.: PCT/GB01/02374

§ 371 (c)(1),  
(2), (4) Date: Nov. 6, 2002

(87) PCT Pub. No.: WO01/91473

PCT Pub. Date: Nov. 29, 2001

(65) Prior Publication Data

US 2003/0142214 A1   Jul. 31, 2003

(30) Foreign Application Priority Data

May 26, 2000 (GB) .................................. 0012992.4

(51) Int. Cl.  
*H04N 17/02* (2006.01)

(52) U.S. Cl. ..................... 348/180; 348/700; 348/701

(58) Field of Classification Search ................ 348/180, 348/700, 701, 181, 189, 193; *H04N 17/02*  
See application file for complete search history.

(56) References Cited

U.S. PATENT DOCUMENTS 5,446,492 A    8/1995   Wolf et al.
5,589,884 A   12/1996   Ohguchi
5,627,765 A *  5/1997   Robotham et al. .......... 708/203
5,754,700 A *  5/1998   Kuzma ....................... 382/236
5,767,922 A *  6/1998   Zabih et al. ................ 348/700
5,799,133 A    8/1998   Hollier et al.
6,014,183 A    1/2000   Hoang
6,119,083 A    9/2000   Hollier et al.
6,539,055 B1 * 3/2003   Hazra ...................... 375/240.16

FOREIGN PATENT DOCUMENTS

DE      19521408 C1    12/1996
EP       0938239 A1     8/1999

OTHER PUBLICATIONS

Franti, "Image Quality Measure Based on Local Visual Properties", Picture Coding Symposium 97, Sep. 10-12, 1997, No. 143, pp. 217-220.  
Rix et al., Models of Human Perception, BT Technology Journal, vol. 17, No. 1, Mar. 19, 1999, pp. 24-34, XP000824576.  
Tan et al, "An Objective Measurement Tool for MPEG Video Quality", Signal Processing, European Journal Devoted to the Methods and Applications of Signal Processing, vol. 70, 1998, pp. 279-294, XP004144970.  
US Application of Hollier et al, U.S. Appl. No. 09/889,041, filed Jul. 11, 2001.  
US Application of Bourret, U.S. Appl. No. 10/221,780, filed Sep. 17, 2002.

* cited by examiner

*Primary Examiner*—Trang U. Tran  
(74) *Attorney, Agent, or Firm*—Nixon & Vanderhye P.C.

(57) ABSTRACT

A non-intrusive test method for video sequences correlates a number of quality indicators derived from a sequence with a matrix of constants to predict a quality score for the sequence.

9 Claims, 6 Drawing Sheets

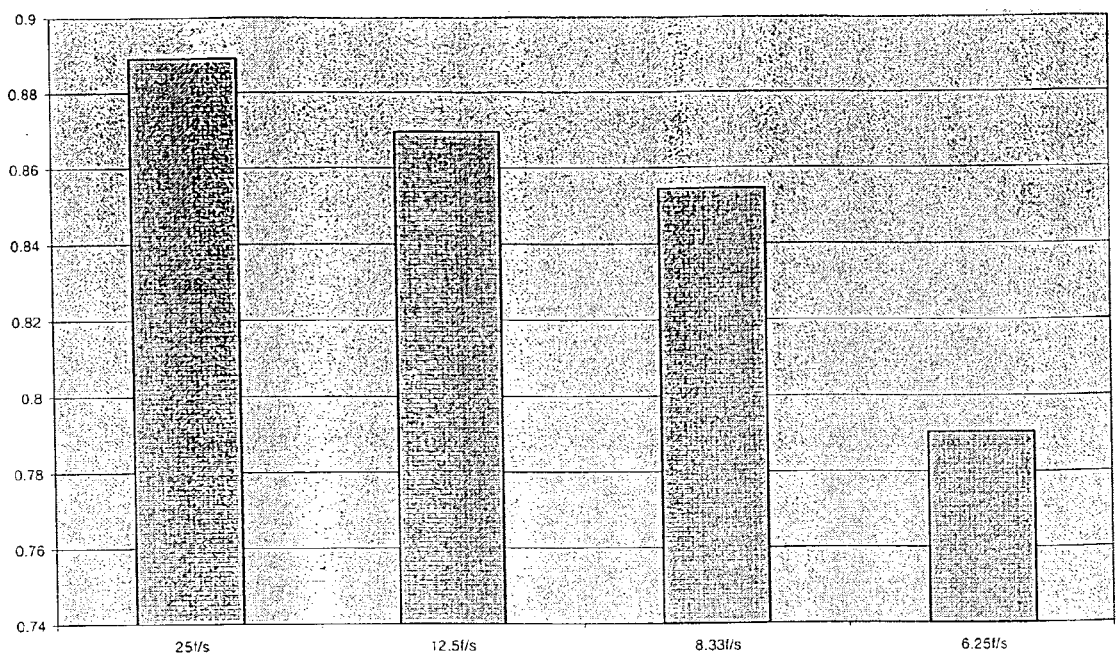
Figure 6a
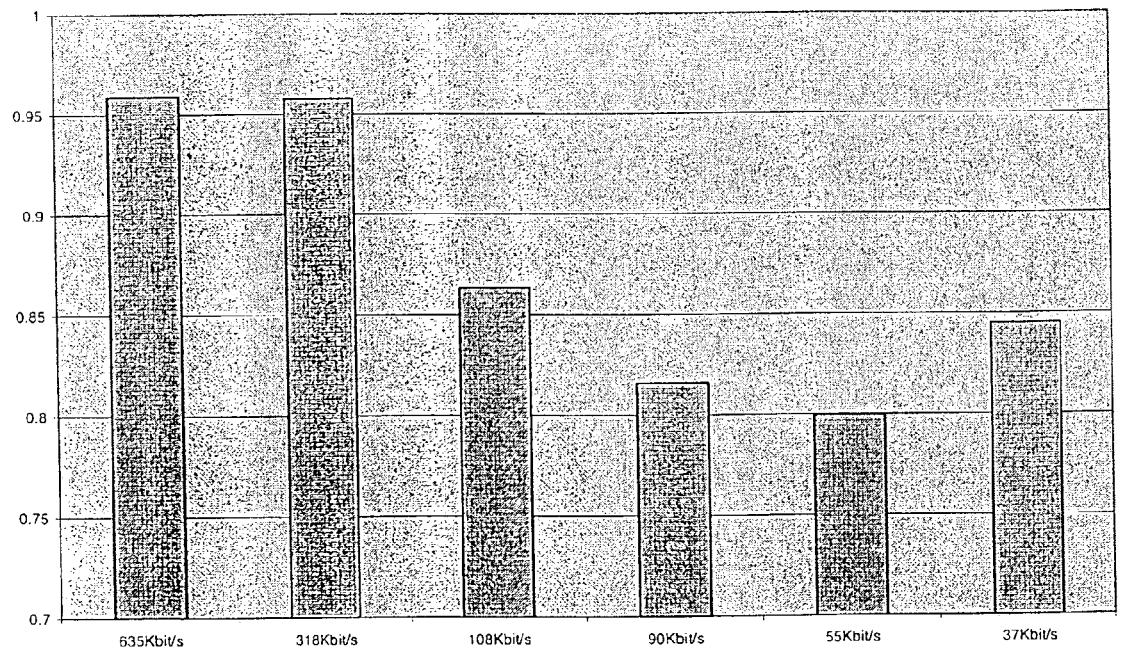
Figure 6b
Figure 6

TEST METHOD

This application is the US national phase of international application PCT/GB01/02374 filed 29 May 2001 which designated the U.S.

BACKGROUND

1. Technical Field

This invention relates to a test method that is can assess the quality of video sequences, in particular digitally encoded video signals.

2. Related Art

In order to reduce the bandwidth necessary to carry video sequences, compression algorithms such as H263 or MPEG rely on a set of well known methods. The first of these is to suppress the information present in each frame that is not perceptually relevant. The result of this operation may not be perceptible to the end user, perceptible but not perceptually relevant, or disruptive to the information content of the frame. In most cases, the effect of the information suppression will be to modify the appearance of textured objects, giving a greater repetitiveness or simplicity.

In real world applications, where the video quality has to be assessed continuously, it can be very difficult or costly to provide a system with a test signal, and the test signal will be transmitted through the system under test. For these reasons, non-intrusive systems have been investigated, where only a reconstructed signal is needed. How can we know the quality of a video sequence that is assessed without being able to determine what has been added to or removed from it? However, just as a subjective viewer knows what quality of video sequence can be expected from a television set, most people are able to make a judgement of quality without referring to the original image. More advanced or experienced users of the system will also know the type of degradation introduced by the medium they use, and will be able to spot such degradations to make a more educated estimation of the quality. Similarly, it is known that each family of compression algorithms tends to introduce its own type of distortion with respect to what can be expected from natural images. This information can be used to determine what amount of distortion has been added to a sequence without referring to its original.

BRIEF SUMMARY

According to a first aspect of the invention there is provided a method of comparing two frames from a video sequence, the method comprising the steps of;

(i) taking a first frame from said video sequence;

(i) taking the subsequent frame-from said sequence;

(iii) comparing one pixel from the first frame with the corresponding pixel from the subsequent frame; and (iv) repeating step (iii) for all pixels in a test area of the first frame.

If the results of the comparison stage indicate a large number of substantially equal pixels then a dropped frame may be inferred. If the results of the comparison stage indicate a small number of substantially equal pixels then a scene cut may be inferred.

According to a second aspect of the invention there is provided a method of predicting a quality score for a video sequence using quality parameters derived from a video sequence as described above

BRIEF DESCRIPTION OF THE DRAWINGS

The invention will now be described, by way of example only, with reference to the following figures in which;

FIGS. 6a–6b shows the correlation of predicted and subjective quality scores for a number of subsets of video sequences.

DETAILED DESCRIPTION OF EXEMPLARY EMBODIMENTS

Figure 1:
FIG. 1 shows a reference video frame.
Figure 2:
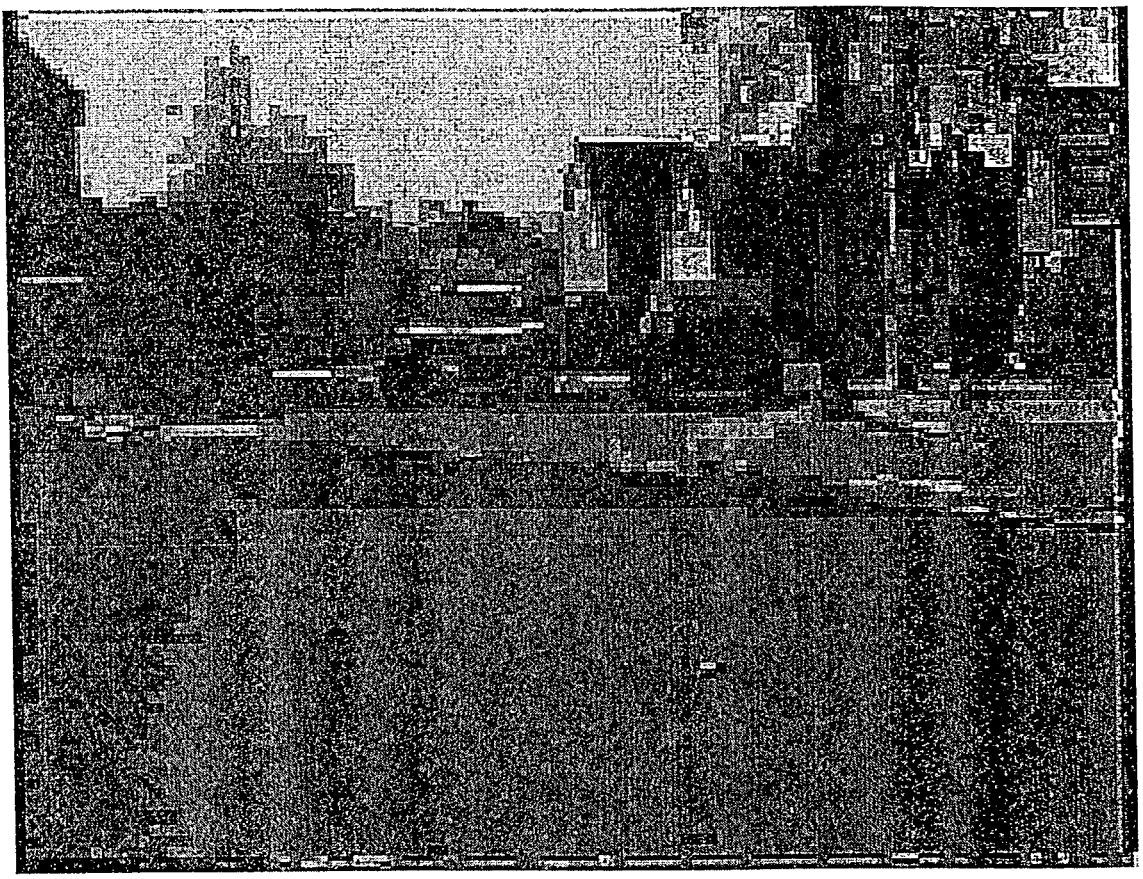
FIG. 2 shows the video frame of FIG. 1 after having been compressed.

Most video sequences used come from natural sources, such as a studio or external scene captured by a video camera. This type of transducer produces white noise, which implies that the value for a given pixel is likely to change over time even if the scenery being analysed is still and in a perfectly controlled environment. Because of its low amplitude and high spatial frequency, this noise is the first feature that will be modified or removed by compression algorithms. For this reason, absence of noise is an indicator of compression level. This effect is shown in the reference and degraded frames shown in FIGS. 1 and 2 respectively. The details present in the tarmac textures, such as the light presence of noise and the gradient have been simplified and replaced by a "flat" area of the average luminance and colour.

In most compression algorithms, this simplification operation is done within blocks of pixels, most often of 8×8 pixels. As a consequence, disparities tend to appear between adjacent regions, making the block structure of the image analysis visible. This effect, referred as blockiness, can easily be measured (see "*Image quality measure based on local visual properties*", P Franti, Picture Coding Symposium 97, 10–12 Sep. 1997, no.143, pp217–20, or M Ghanbari, "*Blockiness Detection for MPEG2-coded video*", IEEE Signal Processing Letters, 7:8 (August 2000), pp 213–215) even without having access to the reference sequence.

A second such method used to reduce bandwidth requirements for video transmissions is movement estimation. This technique involves analysing the motion present between one frame and the next frame in the sequence, so that movement vectors can be transmitted to the decoder in order to reconstruct the sequence from a starting frame. In order to avoid the accumulation of errors over time, motion estimation is not used between every frame. Instead, a temporal pattern can be used, as in the MPEG-2 compression scheme, where original, interpolated and predicted frames are interleaved in a predefined sequence.

The third method used is to reduce the frame rate of the sequence. This is used for lower bit rate applications such as videoconferencing or video over IP, and is simply done by dropping one or more frames from a sequence.

It appears from these three main effects that motion present in a sequence is an important indicator of the image quality. Furthermore, the motion present in a sequence can be determined without the help of the original sequence, enabling the creation of non intrusive assessment systems that can estimate the quality of video systems.

Figure 3:
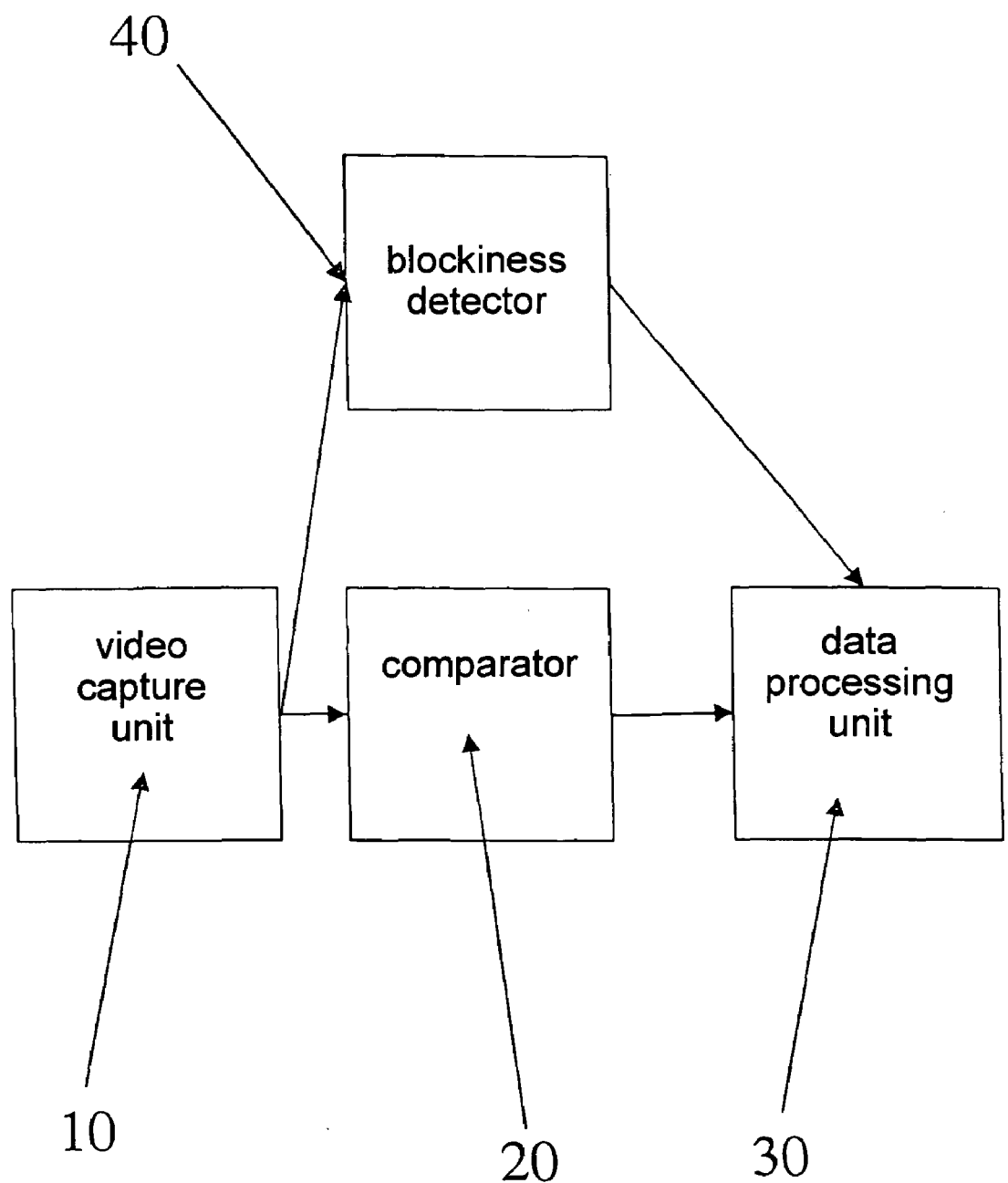
FIG. 3 shows a schematic depiction of apparatus for performing a method according to the present invention.

FIG. 3 shows video capture unit 10, which is suitable for capturing a series of frames from a video sequence. Each frame from the series is sent to blockiness detector 40 and also each frame is transmitted to the comparator 20, along with the subsequent frame from the video sequence. Both the blockiness detector 40 and the comparator 20 are connected to a data processing unit 30, so that outputs from the blockiness detector and the comparator can be passed to the data processing unit.

The blockiness detector 40 analyses the pixels of each video frame received from the video capture unit. As has been described above the video compression technique divides the video image into a number of blocks and a side effect of simplifying the content of each block is to increase the disparity between the blocks, making them clearly visible in the reconstructed image. Different approaches have been tried to detect blockiness (see Franti or Ghanbari op cit) but the preferred technique for detecting blockiness for use in the present invention is to compare the variation of a pixel property (for example the luminance) every 8 pixels with the sum of variations within these 8 pixels. A ratio indicating a higher activity every 8 pixels than within 8 pixel blocks triggers an alarm as it tends to indicate an abrupt change in the pixel property in the transition from a block of very similar values to the next block. Alarms are counted across the whole frame, and the sum is used as an indicator of blockiness for the image. These blockiness indicator values are then transmitted to the data processing unit, along with a reference to the frame to which they correspond.

The two video frames are then sent to comparator 20 which compares the two frames pixel by pixel using one of the properties of a pixel as a basis for the comparison. The results of the comparator are fed to data processing unit 30. The comparator counts all those pixels where there has been no significant change in the pixel property (i.e. the luminance of the pixel in the subsequent frame is within a pre-determined threshold from the luminance of the pixel in the first frame) and determines the proportion of pixels for which the pixel property has not changed. The proportion of pixels in which there has been no change of pixel property and/or the variation in the proportion of pixels in which there has been no change of pixel property can be used to assess the quality of the video compression. Data processing unit 30 stores the pixel proportion values along with a reference to the frame to which they correspond.

Figure 4A:
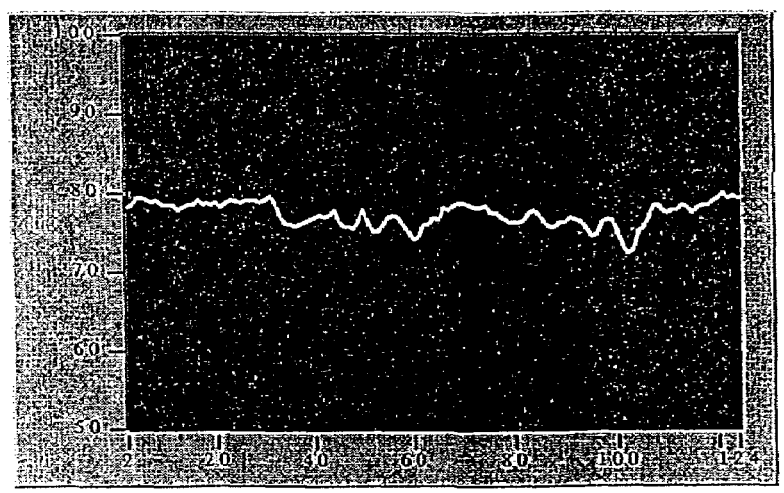
FIGS. 4a–4c shows the variation in unchanged pixel proportion with time for a number of different compression schemes.
Figure 4B:
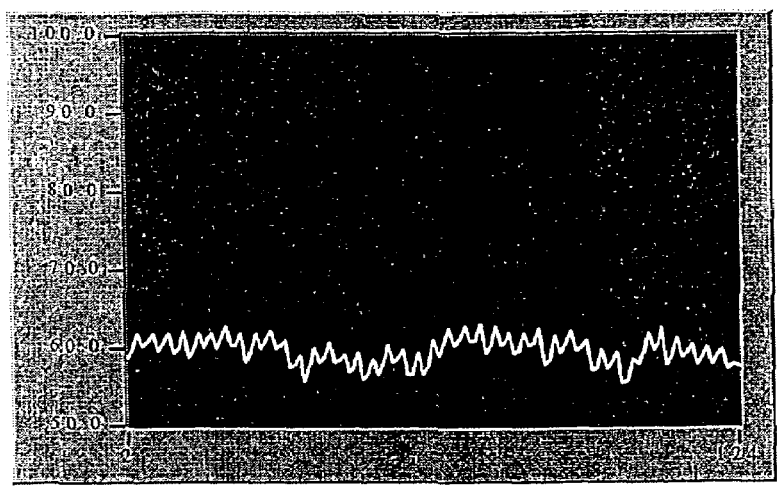
Figure 4C:
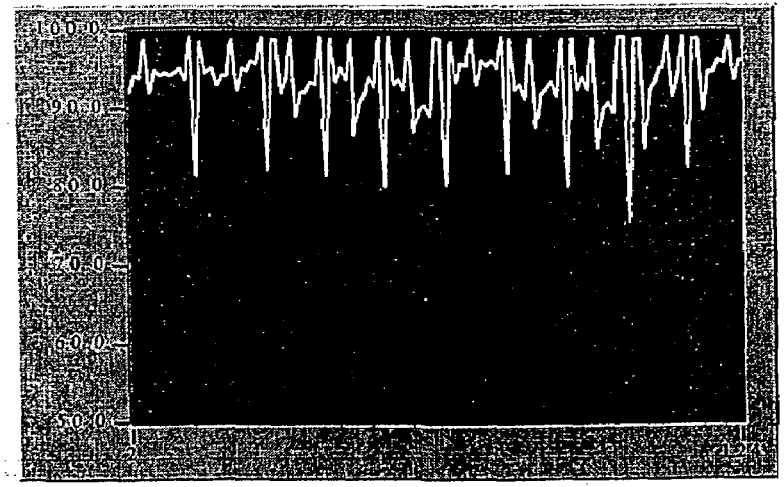

Most video capture systems introduce some noise into the image. For instance, the luminance of a given pixel produced by a video camera which is capturing a stationary image, for example background scenery, will vary in time. As the video compression rate is increased, i.e., the bandwidth of the transmitted video stream is decreased, the variations of a given pixel tend to be suppressed, and the pixel properties (for example chrominance, luminance, etc.) tend towards a constant value. A result of this is that stationary objects present in a compressed video sequence tend to look unnaturally still. This is shown in FIGS. 4a–4c, where FIG. 4a shows the variation of the proportion of unchanged pixels for the reference signal, FIG. 4b shows the variation of the proportion of unchanged pixels when that signal has been compressed at 4 Mb/s and FIG. 4c shows the variation of the proportion of unchanged pixels when the reference signal has been compressed at 1 Mb/s. Thus this variation can also be used to indicate the level of compression that has been applied to a reference signal. Accordingly the data processing unit has the facility to calculate a value which gives an indication of the variation of pixel proportion values# e.g. by performing a fast Fourier transform (FFT) of the pixel proportion values, calculating the derivative of the pixel proportion value, etc. The preferred indicator is to measure the average and standard deviation of the proportion over a 500 m window.

If only a small number of pixels, for example less than 4%, have remained the same then it can be assumed that there has been a cut in the video sequence (i.e. the same scene is being viewed from a different camera angle, or a new scene is now being viewed). As it is not possible to proceed with the analysis of the change in pixel values for these frames because of the scene cut, the analysis may be discontinued and the next frame in the sequence may be selected for comparison.

If a very large number of pixels, for example greater than 98%, have remained the same then there is a high probability that a frame has been dropped, i.e. the same frame has been repeated due to the failure of the subsequent frame in the sequence to be received. The ratio of dropped frames is recorded by the data processing unit, and their position in the sequence.

If a large number of dropped frames are detected within a video sequence then this may be an indicator that the video sequence is being transmitted across an unreliable transport mechanist (in this case, if a video sequence is being transmitted 'live' across a communications network, it may be possible to send a signal to the transmitting codec to decrease the frame rate in use (if the frame rate received is less than the frame rate in use) or to switch to a transport mechanism having a greater quality of service.

These three indicators, the amount of blockiness, the proportion of unchanging pixels and the ratio of dropped frames can be used to generate a model that can be used to assess the quality of a received video sequence in a non-intrusive manner, that is without needing to insert any test signals, or without having access to the initial video sequence. A matrix was formed from each of the three indicators and a time-dependent variation of each indicator. The non-intrusive model was trained and calibrated using linear-regression techniques to assess the qualities of a number of known video sequences which had previously been subjectively judged (that is, the quality of the sequences has been assessed by a number of human viewers).

The non-intrusive model, by design, is looking for known artifacts introduced by the codec in use. For this reason, the characteristics of the codec in use must be known and the model trained for the particular configuration being assessed. This requirement is incompatible with applications such as assessment of quality improvement of compression algorithms or tests on new coding schemes for instance. The model could easily be tricked by hiding such artifacts, without improving the overall quality (the most obvious example would be the use of a blockiness smother algorithm, as described by Shanbari op cit). On the other hand, this approach can be particularly useful to telecom operators who are not changing coding algorithms on daily basis, but who want to monitor the performance of their network.

The first database used to calibrate and train the non-intrusive model is the series of sequences used for the VQEG contests. It consists of a number of sequences which are repeated but at different levels of compression. The resolution used in the sequences and the levels of degradation are consistent with broadcast applications (for the purpose of this calibration, some degradations are discarded, because they are based on analogue techniques. The second database relates to videoconference applications. The format used is either CIF or QCIF, the codec used to generate the degradations are H263 or MPEG4, and IP or UMTS error pattern have been inserted into the data stream before the decoding stage. The main difference between the two databases lies in the way the sequences have been previously assessed. The opinion scores of the VQEG sequences, which are about 10 seconds long in average, have been taken at the end of each presentation. The second database, which contains longer sequences and shows rapid variations in quality, has been assessed continuously. As test material is complicated to produce, the databases were split into a calibration set and a test set.

The test set of each database were processed through the model, which produces a set of parameters for each frame it contains (blockiness, pixel variation and dropped frame ratio). An extra set of parameters is derived from these initial data, by computing their mean and mean and standard variation on blocks of one second. These account for the temporal variations, which are linked to the compression rate. A linear regression is used to obtain the best combination between the extracted parameters and the mean opinion score as previously measured for the given sequences. The combination is then tried with on the parameters extracted for the rest of the database. The produced is compared with the measured mean opinion score, giving us an indicator of the model performance. Once the model linear regression technique has been applied a number of times a composite node is arrived at that can be used to predict the subjective testing of the sequences in the test set.

Figure 5:
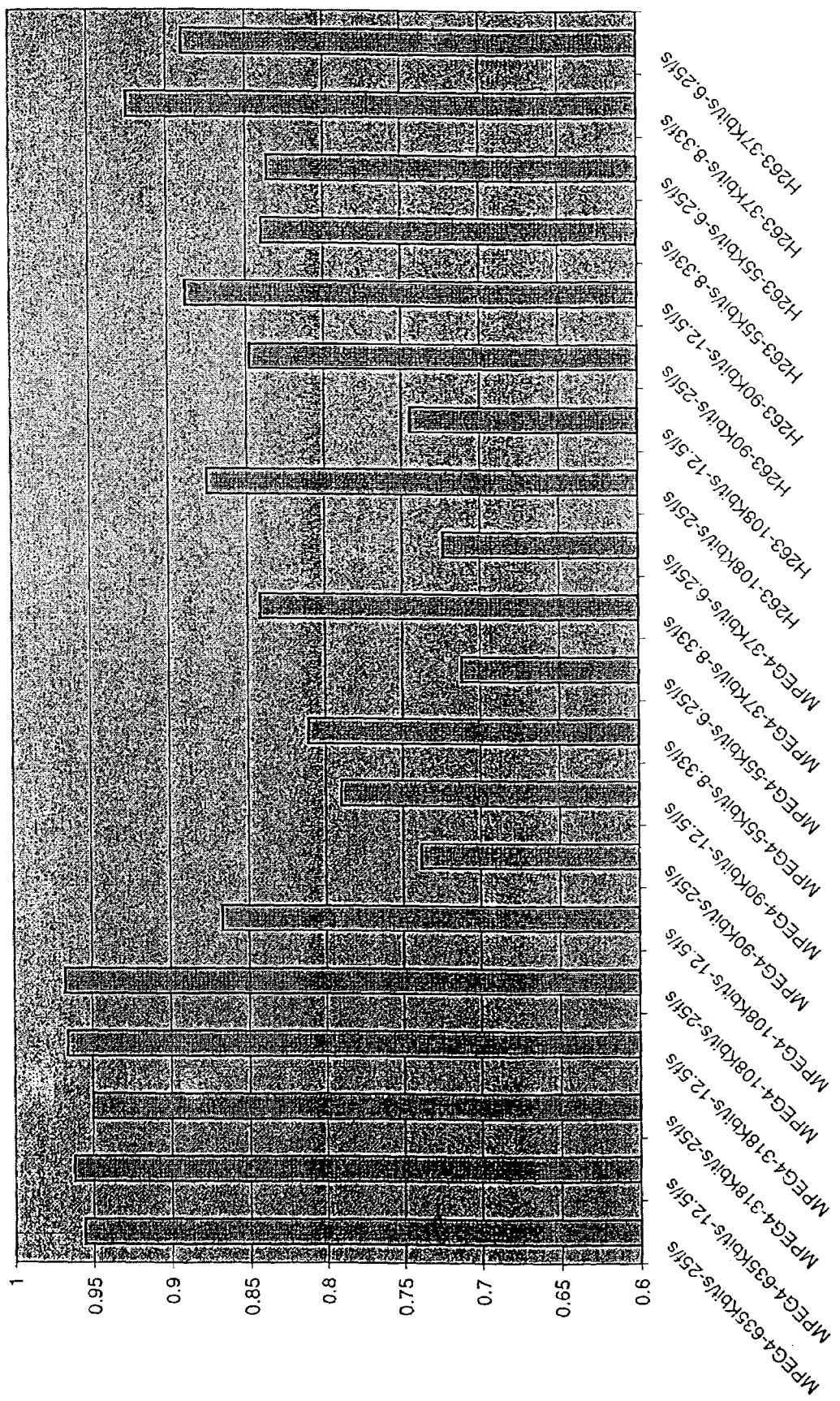
FIG. 5 shows the correlation of predicted and subjective quality scores for a number of video sequences.

The model was also calibrated using a subset of the Eurescom Aquavit database. This bank of subjectively assessed sequences represents a variety of codec and compression rate at levels compatible with multimedia applications and FIG. 5 shows the correlation between the predicted score generated by the non-intrusive model and the mean subjective score for the test set of sequences. FIG. 6a shows the variation of correlation between predicted score and subjective score with the frame rate used in the sequence and FIG. 6b shows the variation of correlation between predicted score and subjective score with the bandwidth used to code the sequence.

It will be realised that another pixel property other than luminance, for example chrominance, hue or one of the RGB signals, could be used to assess the inter-frame variation of pixels. Additionally, all of the pixels in the frame could be compared with their respective pixels in a second frame or a specific sub-set of pixels could be compared with their respective pixels in the second frame.

This organisation of the coded sequence has an effect on the distribution of the motion. In a non coded sequence, the amount of inter-frame change will change slowly in relation to the variation of motion present in the image. However, in the coded sequence, the inter-frame change varies quickly around its average value, with a period related to the coding sequence used by the encoder.

Profiles can be incorporated into the model, according to the type of video sequences processed. Requirements and expectations can be very different according to the type of service or images transmitted. At the equivalent level of quality, a video sequence can be acceptable in video conference but not in broadcast. The bandwidth requirements are much higher for sport than head and shoulder sequences. Profiles take these aspects into account before making a judgement about the quality.

The measurement tool can be used in different ways. By providing a means to measure the quality of refreshment in video sequences, it allows comparison between a reference signal and the same signal once passed through the coding and decoding process. But it can also provides useful information about a sequence without the help of any reference.

If processing power is limited (for example if a real-time assessment is required or the model is being incorporated into a device with limited capabilities) then a less-sophisticated model can be derived by using fewer parameters; the nature of the system to be measured will influence which quality indicator, or its time dependence, can be excluded from the model and the optimal combination can easily be determined by experimentation and further application to linear regression technique.

It will be readily understood that the present invention could be implemented in software alone, i.e. running on a general purpose computer such as personal computer (which may be supplied on a data carrier such as, for example a floppy disc of a CD-ROM), in hardware alone or in a combination of hardware and software (for example programmable DSPs) and that the current invention should not be limited by the form of the implementation.

What is claimed is:

1. A test method of comparing two frames from a received video sequence to non-intrusively assess the quality of a received video sequence, the method comprising:
   (i) taking a first frame from said received video sequence;
   (ii) taking the subsequent frame from said sequence;
   (iii) comparing one pixel from the first frame with the corresponding pixel from the subsequent frame to detect variation of a pixel property with respect to nearby pixels within a first neighborhood as compared to nearby pixels in a second neighborhood beyond said first neighborhood to drive a blockiness indicator value for a compared frame;
   (iv) repeating step (iii) for all pixels in a test area of the first frame;
   (v) inferring a scene cut if the results of the comparison stage indicate a small number of substantially equal pixels;
   (vi) ignoring comparisons indicating a scene cut in deriving a frame quality assessment using said blockiness indicator values; and
   (vii) providing said frame quality assessment as data output from said method.

2. A method as in claim 1 wherein said compared pixel property is a luminance of the corresponding pixels is compared.

3. A method as in claim 1 further comprising inferring a dropped frame if the results of the comparison stage indicate a large number of substantially equal pixels and ignoring comparisons indicating a dropped frame.

4. A method of non-intrusively assessing the quality of a received video sequence, the method comprising:
   (i) comparing each frame in the received video sequence with a subsequent frame by
      (a) taking a first frame from said video sequence;
      (b) taking the subsequent frame from said sequence;
      (c) comparing a pixel property of one pixel from the first frame with the same pixel property of a corresponding pixel from the subsequent frame to detect variation of that pixel property; and
      (d) repeating step (c) for all pixels in a test area of the first frame to determine the magnitude of pixel variation for that test area;

(ii) ignoring those comparisons indicating a dropped frame or a scene cut;
(iii) calculating a quality figure for the video sequence from the remaining comparison values; and
(iv) outputting data representing the quality of said sequence.

5. A method of assessing the quality of a video sequence, the method comprising:
(i) comparing all of the frames in the video sequence with the subsequent frame in accordance with claim 3;
(ii) ignoring those comparisons indicating a dropped frame or a scene cut; and
(iii) calculating a quality figure from the remaining comparison values including an estimated value of compression applied to the received video sequence during transmission; and
(iv) outputting data representing the quality of said sequence.

6. A method as in claim 5 further comprising:
calculating a further quality figure associated with temporal variations in said quality figure; and
using said quality figure and said further quality figure to assess the quality of said video sequence.

7. A method for assessing the quality of a received video sequence in a non-intrusive manner without access to the as transmitted video sequence, said method comprising:
processing said video sequence to derive a value representing measured variation of a pixel property value from one frame to the next in said received video sequence;
if measured pixel variation is above a predetermined first threshold, inferring that there has been a scene cut in the video sequence and omitting analysis of the video sequence for frames adjacent the detected scene cut;
if measured pixel variation is below a predetermined second threshold, inferring that a frame has been dropped, and recording the occurrence of dropped frames as one quality measure;
using said measurements to derive video sequence quality values for the amount of blockiness, the proportion of unchanging pixels and the ratio of dropped frames to generate a non-intrusive model representing quality of a received video sequence in a non-intrusive manner without inserting test signals and without having access to an initial version of the received video sequence prior to its transmission.

8. A method as in claim 7 wherein generation of said non-intrusive model comprises:
forming a matrix from each of indicators for blockiness, unchanging pixels and dropped frames and a time-dependent variation of each indicator.

9. A method as in claim 7 further comprising:
training and calibrating said non-intrusive model using linear-regression to assess qualities of plural known video sequences which were previously subjectively judged by a number of human viewers.

* * * * *